United States Patent
Welchko et al.

(10) Patent No.: US 8,463,483 B2
(45) Date of Patent: Jun. 11, 2013

(54) METHOD AND SYSTEM FOR MONITORING VEHICLE ELECTRICAL SYSTEMS

(75) Inventors: Brian A. Welchko, Torrance, CA (US); Abbas Raftari, West Bloomfield, MI (US); Silva Hiti, Redondo Beach, CA (US); Jeong J. Park, Ann Arbor, MI (US); Hanne Buur, Brighton, MI (US); Wei D. Wang, Troy, MI (US); William R. Cawthorne, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 533 days.

(21) Appl. No.: 12/704,659

(22) Filed: Feb. 12, 2010

(65) Prior Publication Data
US 2011/0202226 A1    Aug. 18, 2011

(51) Int. Cl.
*G06F 7/00* (2006.01)
*G06F 19/00* (2011.01)
*G01M 17/00* (2006.01)

(52) U.S. Cl.
USPC ............ 701/29.1; 701/32.9; 340/635; 705/34

(58) Field of Classification Search
USPC . 701/70, 93, 41, 300, 29.2, 49, 301; 123/399; 477/120; 180/65.265, 65.6
See application file for complete search history.

(56) References Cited

U.S. PATENT DOCUMENTS

| | | | |
|---|---|---|---|
| 5,966,305 A | 10/1999 | Watari et al. | |
| 7,103,460 B1 * | 9/2006 | Breed | 701/32.9 |
| 7,714,735 B2 * | 5/2010 | Rockwell | 340/635 |
| 2004/0236537 A1 | 11/2004 | Eich et al. | |
| 2006/0242035 A1 * | 10/2006 | Corbett et al. | 705/34 |
| 2008/0288192 A1 * | 11/2008 | Kumar et al. | 702/60 |
| 2010/0169716 A1 * | 7/2010 | Ben-Yehuda et al. | 714/48 |

FOREIGN PATENT DOCUMENTS

| | | |
|---|---|---|
| CN | 1789033 A | 6/2006 |
| CN | 101066674 A | 11/2007 |

OTHER PUBLICATIONS

Chinese Patent and Trademark Office. Chinese Office Action for Application No. 201110036176.9 dated Jan. 29, 2013.

* cited by examiner

*Primary Examiner* — Thomas Black
*Assistant Examiner* — Robert Payne
(74) *Attorney, Agent, or Firm* — Ingrassia Fisher & Lorenz, P.C.

(57) ABSTRACT

Methods and systems are provided for monitoring an electrical system of a vehicle. Data pertaining to the electrical system is obtained. Calculation modules are performed using the data to generate intermediate determinations. An aggregate calculation module is performed using each of the intermediate determinations to generate an aggregate determination pertaining to the electrical system. Redundant intermediate calculations are performed using the data to generate redundant intermediate determinations. Each of the redundant intermediate determinations is used for comparison with a respective intermediate determination.

17 Claims, 3 Drawing Sheets

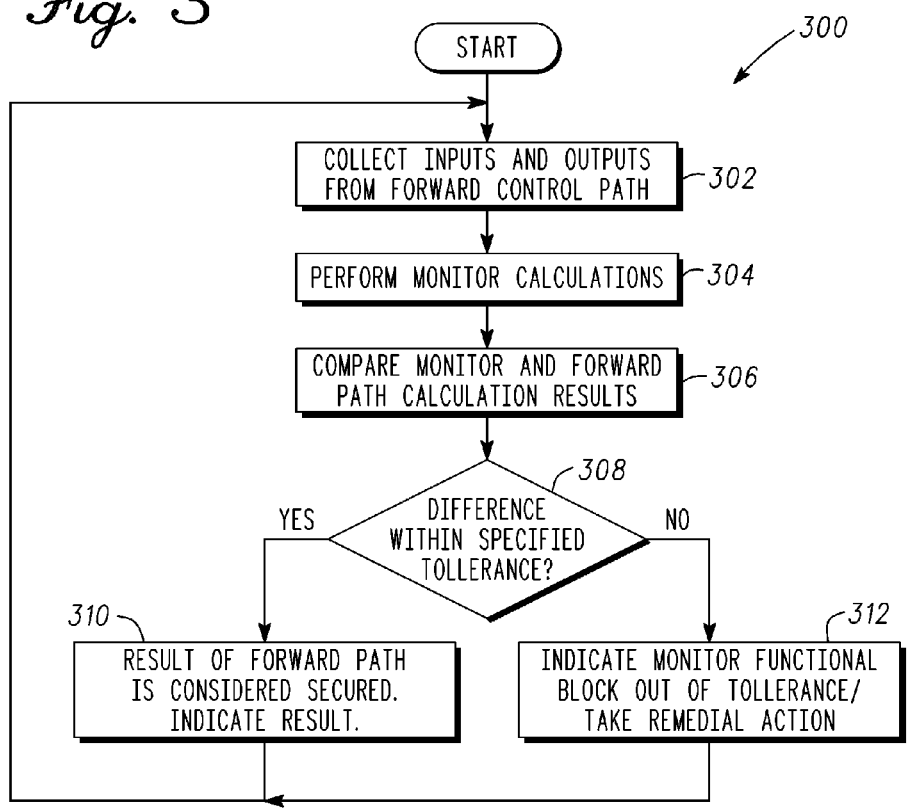
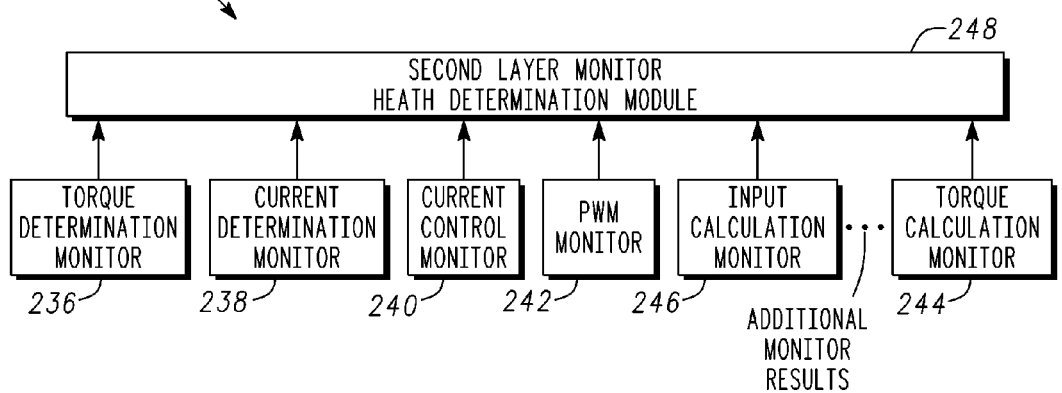

METHOD AND SYSTEM FOR MONITORING VEHICLE ELECTRICAL SYSTEMS

TECHNICAL FIELD

The present invention generally relates to vehicle electrical systems and, more particularly, relates to a method and system for monitoring electrical systems of vehicles.

BACKGROUND OF THE INVENTION

In recent years, advances in technology, as well as ever-evolving tastes in style, have led to substantial changes in the design of automobiles. One of the changes involves the complexity of the electrical and drive systems within automobiles, particularly alternative fuel vehicles, such as hybrid, battery electric, and fuel cell vehicles. Such alternative fuel vehicles typically use one or more electric motors, perhaps in combination with another actuator, to drive the wheels.

Such vehicles typically include a vehicle propulsion system having multiple components that contribute to the propulsion of the vehicle. These components can be further grouped into subsystems, such as the drivetrain, the internal combustion engine, and the hybrid electric drive system. The electric drive system typically includes multiple components including sensors, energy storage, electronic inverters, electric motors, and a control system. To ensure the operating integrity of the electric drive system, a multi-layer monitoring system may be used to ensure that the output of the electric drive (torque, speed, etc.) is as requested, or possibly in the case of a fault situation, as delivered.

A commonly employed first layer monitoring system performs diagnostics on all sensor inputs. Such low level diagnostics may include, but are not limited to, checking whether a sensor is able to communicate or checking to see if a sensor reading is in its expected or allowable operating range. Such sensors may include current sensors, voltage sensors, position sensors, speed sensors, temperature sensors, physical and/or virtual software replacements, and the like.

A second layer monitoring system may perform monitoring on the control system to ensure that it is producing outputs as intended. Such a second layer monitoring system will typically monitor the entire control system from input to output or by monitoring the individual components of the control system separately to determine the integrity of the overall control system. For example, a second layer monitoring system can be used to verify that the correct outputs are produced for the given inputs in order to detect errors in the computational processors, memory, and data storage. A conventional method for checking the duty cycles is to essentially perform an entire redundant calculation. However, such a calculation demands considerable processing power and memory.

Accordingly, it is desirable to provide a method and system for performing second layer monitoring of values for electrical systems of vehicles. Furthermore, other desirable features and characteristics of the present invention will become apparent from the subsequent description taken in conjunction with the accompanying drawings and the foregoing technical field and background.

SUMMARY

In accordance with an exemplary embodiment, a method for monitoring an electrical system of a vehicle is provided. The method comprises the steps of performing an intermediate calculation using data pertaining to the electrical system to generate an intermediate result using a processor, performing an aggregate calculation using the intermediate result to generate a calculated value pertaining to the electrical system using the processor, and performing a redundant intermediate calculation using the data and the processor to generate a redundant intermediate result.

In accordance with another exemplary embodiment, a method for monitoring an electrical system of a vehicle is provided. The method comprises the steps of performing a plurality of calculation modules using data pertaining to the electrical system to generate a plurality of intermediate determinations, each calculation module generating a respective one of a plurality of intermediate determinations using the data and a processor, performing an aggregate calculation module using each of the plurality of intermediate determinations to generate an aggregate determination pertaining to the electrical system using the processor, and performing a plurality of redundant intermediate calculations using the data to generate a plurality of redundant intermediate determinations, each of the plurality of redundant intermediate calculations generating a corresponding one of the plurality of redundant intermediate determinations that corresponds to a respective one of the plurality of intermediate determinations using the processor.

In accordance with a further exemplary embodiment, a system for monitoring an electrical system of a vehicle is provided. The system comprises a plurality of sensors and a processor. The plurality of sensors are configured to obtain data pertaining the electrical system. The processor is coupled to the plurality of sensors, and is configured to perform a plurality of calculation modules using data pertaining to the electrical system to generate a plurality of intermediate determinations, each calculation module generating a respective one of a plurality of intermediate determinations using the data, perform an aggregate calculation module using each of the plurality of intermediate determinations to generate an aggregate determination pertaining to the electrical system, and perform a plurality of redundant intermediate calculations using the data to generate a plurality of redundant intermediate determinations, each of the plurality of redundant intermediate calculations generating a corresponding one of the plurality of redundant intermediate determinations that corresponds to a respective one of the plurality of intermediate determinations.

DESCRIPTION OF THE DRAWINGS

The present invention will hereinafter be described in conjunction with the following drawing figures, wherein like numerals denote like elements.

FIG. 3 is a flowchart for a process for monitoring electrical control systems of vehicles, and that can be used in connection with the vehicle of FIG. 1 and the motor control system and method of FIG. 2, in accordance with an exemplary embodiment; and FIG. 4 is a functional block diagram of a distributed monitor system hierarchy, and that can be used in connection with the vehicle of FIG. 1, the motor control system and method of FIG. 2, and the process of FIG. 3, in accordance with an exemplary embodiment.

DESCRIPTION OF AN EXEMPLARY EMBODIMENT

Figure 1:
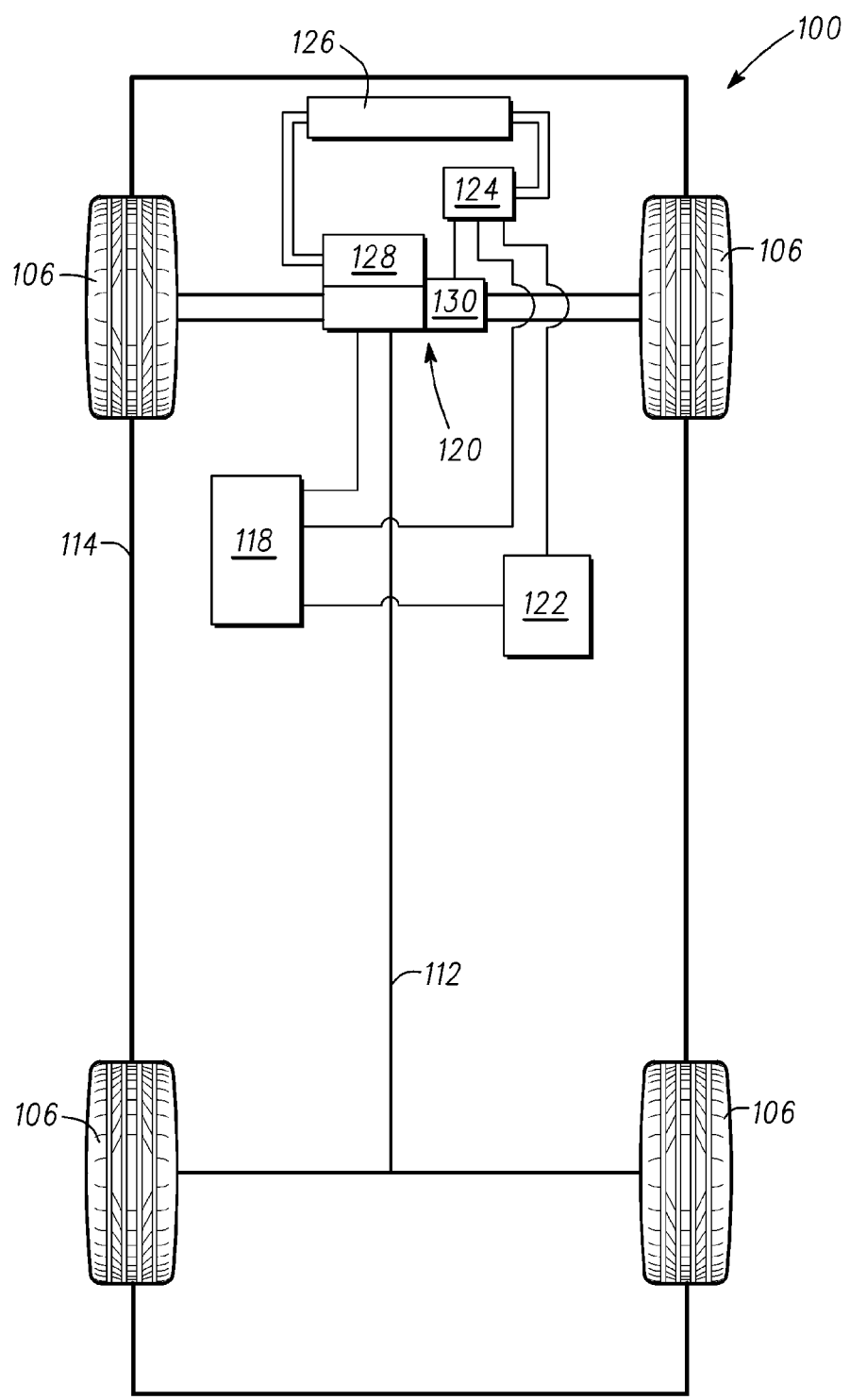
FIG. 1 is a schematic view of an exemplary vehicle, such as an automobile, in accordance with an exemplary embodiment.

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Further, various components and features described herein may be referred to using particular numerical descriptors, such as first, second, third, etc., as well as positional and/or angular descriptors, such as horizontal and vertical. However, such descriptors may be used solely for descriptive purposes relating to drawings and should not be construed as limiting, as the various components may be rearranged in other embodiments. It should also be understood that FIGS. 1-4 are merely illustrative and may not be drawn to scale.

FIGS. 1-4 illustrate a method and system for monitoring an automotive electrical system. In one preferred embodiment, the electrical system includes a power electronics unit (e.g., a direct current-to-alternating current (DC/AC) inverter or a direct current-to-direct current (DC/DC) converter) with one or more power switches or transistors. First and second voltage commands corresponding to respective first and second components of a commanded voltage vector on a synchronous frame of reference coordinate system are received. A plurality of duty cycles for operating the at least one switch are calculated based on the first and second voltage commands. First and second actual voltages are calculated based on the plurality of duty cycles. The first and second actual voltages correspond to respective first and second components of an actual voltage vector on the synchronous frame of reference coordinate system. An indication of a fault is generated based on the difference between the first component of the commanded voltage vector and the first component of the actual voltage vector and the difference between the second component of the commanded voltage vector and the second component of the actual voltage vector. The electrical system also preferably produces an electric motor engine torque for the vehicle, and that can be monitored using methods and systems disclosed herein.

FIG. 1 illustrates a vehicle 100, according to one embodiment of the present invention. The vehicle 100 includes a chassis 102, a body 104, four wheels 106, and an electronic control system 108. The body 104 is arranged on the chassis 102 and substantially encloses the other components of the vehicle 100. The body 104 and the chassis 102 may jointly form a frame. The wheels 106 are each rotationally coupled to the chassis 102 near a respective corner of the body 104.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD), or another type of vehicle. The vehicle 100 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

In the exemplary embodiment illustrated in FIG. 1, the vehicle 100 is an HEV, and further includes an actuator assembly 120, a battery (or a DC power supply) 122, a power converter assembly (e.g., an inverter or inverter assembly) 124, and a radiator 126. The actuator assembly 120 includes a combustion engine 128 and an electric motor/generator (or motor) 130.

Still referring to FIG. 1, the combustion engine 128 and/or the electric motor 130 are integrated such that one or both are mechanically coupled to at least some of the wheels 106 through one or more drive shafts 132. In one embodiment, the vehicle 100 is a "series HEV," in which the combustion engine 128 is not directly coupled to the transmission, but coupled to a generator (not shown), which is used to power the electric motor 130. In another embodiment, the vehicle 100 is a "parallel HEV," in which the combustion engine 128 is directly coupled to the transmission by, for example, having the rotor of the electric motor 130 rotationally coupled to the drive shaft of the combustion engine 128.

The radiator 126 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 128 and the inverter 124.

Referring again to FIG. 1, in the depicted embodiment, the inverter 124 receives and shares coolant with the electric motor 130. However, other embodiments may use separate coolants for the inverter 124 and the electric motor 130. The radiator 126 may be similarly connected to the inverter 124 and/or the electric motor 130.

The electronic control system 118 is in operable communication with the actuator assembly 120, the high voltage battery 122, and the inverter 124. Although not shown in detail, the electronic control system 118 includes various sensors and automotive control modules, or electronic control units (ECUs), such as an inverter control module, a motor controller, and a vehicle controller, and at least one processor and/or a memory which includes instructions stored thereon (or in another computer-readable medium) for carrying out the processes and methods as described below.

Figure 2:
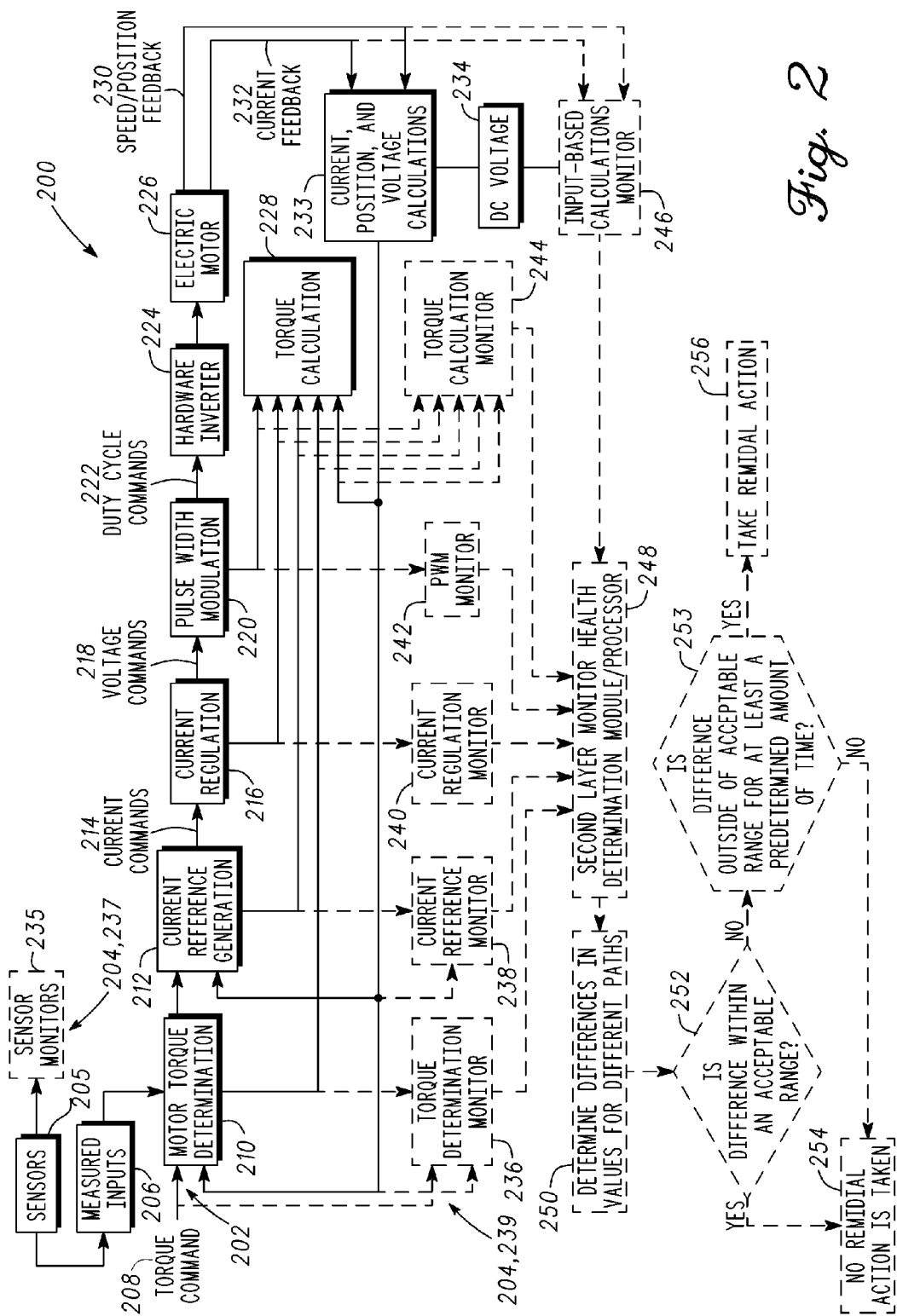
FIG. 2 is a functional block diagram of a motor control system and method for a vehicle, such as the vehicle of FIG. 1, in accordance with an exemplary embodiment.

FIG. 2 is a functional block diagram of a motor control system and method 200 for a vehicle, such as the vehicle 100 of FIG. 1, in accordance with an exemplary embodiment. In one preferred embodiment, the motor control system and method 200 operates in a motor torque controlled system. In another preferred embodiment, the motor control system and method 200 operates in a torque regulated system. In still other embodiments, the motor control system and method 200 may operate in a speed controlled system, among other possible variations.

As depicted in FIG. 2, the motor control system and method 200 consists of multiple operations in a normal or forward control path 202 shown in FIG. 2 with solid lines. This preferably includes, but is not limited to: obtaining measured inputs 206 from sensors, performing calculations on the measured inputs 206, receiving a torque command 208, processing the torque command 208, generating a motor torque determination 210 using the measured inputs 206 and the torque command 208, generating a reference current 212 using the motor torque determination 210, converting the torque command 208 to current commands 214 based on present speed and available voltage and the reference current 212, and providing current regulation 216 using the current commands 214. The output of the current regulator performing the current regulation 216 includes the voltage commands 218 for the output voltage needed to produce the requested currents pursuant to the current commands 218.

A pulse width modulation (PWM) system is used for pulse width modulation 220 by generating the necessary gate pulses or duty cycle commands 222, which are sent to the inverter hardware 224 stage to control an electric motor 226 to the desired speed and/or torque as calculated in the calculation block 228. The torque values (and/or other parameter values) for the electric motor 226 are preferably calculated in the calculation block 228 using the inputs from the motor torque determination 210, the reference current 212 generation, the current regulation 216, and the pulse width modulation 220.

In addition, speed and/or position feedback 230, current feedback 232, and DC voltage 234 values are also preferably used in performing current, position, and voltage calculations 233. The results of the position feedback 230, current feedback 232, and DC voltage 234 values are provided for use in subsequent iterations of the motor torque determination 210, preferably also along with updated values of the measured inputs 206 and the torque command 208. Additional considerations may also be employed by the forward control path 202 such as, by way of example only, system temperatures, system limitations, and additional communications and/or or other feedbacks to the overall system control in terms of operating status and availability.

The forward control path 202 may also use any and all available information and/or variables to produce and indicate an estimate of the operating output, such as the electric motor torque as calculated in the calculation block 228. In FIG. 2, this is shown as a torque calculation consisting of estimating the torque being produced by the electric motor in the calculation block 228. However, as described above, in other embodiments, vehicle speed and/or other parameter values may be calculated, instead of or in addition to the electric motor torque.

The control system and method 200 also include a monitoring flow path 204 (also referenced herein as a monitoring path 204), depicted in dashed lines in FIG. 2. In the depicted embodiment, the monitoring path 204 includes two layers of monitoring, namely a first layer 237 and a second layer 239.

In an exemplary embodiment, the first layer 237 of monitoring includes the use of sensor monitors 235 for the individual sensors 205 providing the measured inputs 206. For example, such sensor monitors 235 may be used to monitor whether the sensors 205 are turned on and/or that the sensors 205 are producing the measured inputs 206 within acceptable ranges of values.

The second layer 239 of monitoring in the control system and method 200 preferably processes all inputs and performs all calculations independently, utilizing separate memory and data storage areas. The distributed second layer 239 monitoring system performs an independent calculation of the forward control path 202 and performs rationalization with the results of the forward control path 202 to verify that both the forward control path 202 and monitoring path 204 calculations are within a specified tolerance of one another.

The second layer 239 distributed monitor breaks the forward control path into small function blocks. The second layer 239 distributed monitor then performs a monitoring function on each of the small functional blocks independently. The small functional blocks are subsequently combined to form a complete loop of the control system.

In a preferred embodiment, the second layer 239 comprises monitoring of all intermediate calculations of the control system and method 200 as separate functional blocks independent of one another for monitoring purposes. Specifically, in the depicted embodiment, the second layer 239 includes a torque determination monitor 236, a current reference monitor 238, a current regulation monitor 240, a pulse width modulation monitor 242, a torque calculation monitor 244, and an input-based calculations monitor 246.

The torque determination monitor 236 provides monitoring of the motor torque determination 210. In one preferred embodiment, the motor torque determination 210 uses a first set of data from the measured inputs 206 in determining the motor torque, and the torque determination monitor 236 uses a redundant or second set of data from the measured inputs 206 in providing redundant calculations of the motor torque for comparison with the motor torque determination 210. In another preferred embodiment, the torque determination monitor 236 provides backwards calculations using the results of the motor torque determination 210 for comparisons with the input data from the measured inputs 206 that was used in the motor torque determination 210. In yet another preferred embodiment, the torque determination monitor 236 provides redundant calculations of some or all of the calculations of the motor torque determination 210, and/or performs such calculations in a different reference frame and/or during a different time period.

The current reference monitor 238 provides monitoring of the reference current 212 generation. In one preferred embodiment, the reference current 212 generation uses a first set of data from the measured inputs 206 in determining the reference current, and the current reference monitor 238 uses a redundant or second set of data from the measured inputs 206 in providing redundant calculations of the reference current for comparison with the reference current 212 generation. In another preferred embodiment, the current reference monitor 238 provides backwards calculations using the results of the reference current 212 generation for comparisons with the input data from the measured inputs 206 that was used in the reference current 212 generation. In yet another preferred embodiment, the current reference monitor 238 provides redundant calculations of some or all of the calculations of the reference current 212 generation, and/or performs such calculations in a different reference frame and/or during a different time period.

The current regulation monitor 240 provides monitoring of the current regulation 216. In one preferred embodiment, the current regulation 216 uses a first set of data from the measured inputs 206 in determining the regulated current, and the current regulation monitor 240 uses a redundant or second set of data from the measured inputs 206 in providing redundant calculations of the regulated current for comparison with the current regulation 216. In another preferred embodiment, the current regulation monitor 240 provides backwards calculations using the results of the current regulation 216 for comparisons with the input data from the measured inputs 206 that was used in the current regulation 216. In yet another preferred embodiment, the current regulation monitor 240 provides redundant calculations of some or all of the calculations of the current regulation 216, and/or performs such calculations in a different reference frame and/or during a different time period.

The pulse width modulation monitor 242 provides monitoring of the pulse width modulation 220. In one preferred embodiment, the pulse width modulation 220 uses a first set of data from the measured inputs 206 in determining the pulse width modulation, and the pulse width modulation monitor 242 uses a redundant or second set of data from the measured inputs 206 in providing redundant calculations of the pulse width modulation for comparison with the pulse width modulation 220. In another preferred embodiment, the pulse width modulation monitor 242 provides backwards calculations using the results of the pulse width modulation 220 for comparisons with the input data from the measured inputs 206 that was used in the pulse width modulation 220. In yet another preferred embodiment, the pulse width modulation monitor 242 provides redundant calculations of some or all of the calculations of the pulse width modulation 220, and/or performs such calculations in a different reference from and/or during a different time period.

The torque calculation monitor 244 provides monitoring of the torque calculation block 228 (and/or any other calculations of the calculation block 228 of FIG. 2). In one preferred embodiment, the torque calculation block 228 uses a first set of data from the measured inputs 206 in determining the torque calculation, and the torque calculation monitor 244 uses a redundant or second set of data from the measured inputs 206 in providing redundant calculations of the torque calculation (and/or any other calculations of the calculation block 228) for comparison with the torque calculation block 228. In another preferred embodiment, the torque calculation monitor 244 provides backwards calculations using the results of the torque calculation block 228 (and/or any other calculations of the calculation block 228) for comparisons with the input data from the measured inputs 206 that was used in the torque calculation block 228. In yet another preferred embodiment, the torque calculation monitor 244 provides redundant calculations of some or all of the calculations of the torque calculation block 228 (and/or any other calculations of the calculation block 228), and/or performs such calculations in a different reference from and/or during a different time period.

The input-based calculations monitor 246 provides monitoring of the measured inputs 206 and/or the current, position, and voltage calculations 233. In one preferred embodiment, the current, position, and voltage calculations 233 uses a first set of data from the measured inputs 206 in determining the current, position, and voltage values, and the input-based calculations monitor 246 uses a redundant or second set of data from the measured inputs 206 in providing redundant calculations of the current, position, and voltage calculations 233 for comparison with the current, position, and voltage calculations 233. In another preferred embodiment, the input-based calculations monitor 246 provides backwards calculations using the results of current, position, and voltage calculations 233 for comparisons with the input data that was used in the torque calculation block 228. In yet another preferred embodiment, the input-based calculations monitor 246 provides redundant calculations of some or all of the calculations of the current, position, and voltage calculations 233, and/or performs such calculations in a different reference from and/or during a different time period. In addition, in a preferred embodiment, the input-based calculations monitor 246 also monitors the measured inputs 206 over time.

The results of the calculations of the torque determination monitor 236, the current reference monitor 238, the current regulation monitor 240, the pulse width modulation monitor 242, the torque calculation monitor 244, and the input-based calculations monitor 246 are provided to a second layer monitor health determination module 248 for processing. The second layer monitor health determination module 248 includes a processor that compares the values from the various second layer 239 monitoring path 204 modules (e.g., the torque determination monitor 236, the current reference monitor 238, the current regulation monitor 240, the pulse width modulation monitor 242, the torque calculation monitor 244, and the input-based calculations monitor 246) with corresponding values from corresponding modules of the forward control path 202 (e.g., the motor torque determination 210, the reference current 212 generation, the current regulation 216, the pulse width modulation 220, the torque calculation block 228, and the current, position, and voltage calculations 233, respectively).

Specifically, in the depicted embodiment, the processor of the second layer monitor health determination module 248 calculates differences 250 between the values from the various second layer 239 monitoring path 204 modules and the corresponding values from the corresponding modules of the forward control path, and determines whether these calculated differences 250 are within acceptable ranges (step 252). If the differences are within acceptable tolerance ranges, then no remedial action is required (step 254). Conversely, if one or more of the differences are not within acceptable tolerance ranges, then remedial action is taken (step 256). Such remedial action may include, by way of example only, performing redundant calculations, providing warnings to users and/or operators of the control system and method 200, shutting down part or all of the control system and method 200, and/or other remedial measures. In addition, in certain embodiments, the determination in step 252 also includes a determination of whether the difference is beyond an acceptable tolerance range for at least a predetermined length of time, and the remedial action (step 256) is taken only if the difference is beyond an acceptable tolerance range for at least the predetermined length of time.

The distribution of the second layer 239 of the monitoring path 204 into such small functional blocks has several advantages, such as those described below. One advantage to this distribution is that this can be used in the separation of monitoring analog and digital systems. For example, digital computations may be used to calculate the expected results of an analog input in order to increase confidence that the subsequent analog input is as expected. Performing a redundant calculation may be the preferred implementation of a second layer monitor, but, this would duplicate the required computing power and memory required, which may not always be feasible, or necessary.

By distributing the second layer 239 monitor into small functional blocks, the second layer 239 distributed monitor may consider only the function of the independent block. As a result, the second layer 239 distributed monitor may employ an alternative to performing a redundant calculation. For example, for each particular functional block, the second layer 239 distributed monitor may employ a functionally equivalent calculation or some form of backward calculation with the objective of verifying that the correct output of the module has been produced for the given inputs.

An example of a functionally equivalent calculation could include performing calculations in a different reference frame than is used for the overall control system such that the particular monitor of the functional block results in a simplified calculation for the monitor but would be disadvantageous if used for the overall control system. In this case, the forward control path 202 and monitoring path 204 calculations would need to be within a specified tolerance of one another in order to be considered verified or secured.

In addition, as described above, a backward calculation may also be employed in the event that an equivalent or approximate inverse calculation on the outputs of the functional block would produce the given inputs to the functional block. The distributed monitor can take advantage of these alternative calculations in situations where a small differences in the forward and monitor functional blocks would not contribute to a significant error or difference to the overall control system.

Similarly, the second layer 239 distributed monitor can be used to verify the integrity of the small functional blocks by detecting conditions where a small error in the functional block would subsequently produce a large deviation in the overall control system. For example, such information can be incorporated into the determinations of step 252 as to whether differences between values of the second layer 239 of the monitoring path 204 and respective values from the forward control path 202 are sufficiently large so as to warrant remedial action (step 256). As a result, the distributed monitor may detect errors in the computation system prior to the errors propagating through the overall system to the system output.

Depending upon the method used for the calculations, the tolerance of the calculation may vary. For example, if precise calculations can be employed, then a very small difference between the calculations may be employed. For approximate calculations in the second layer 239, a larger difference may be allowable.

FIG. 3 is a flowchart for a process 300 for monitoring motor control values for a vehicle, and that can be used in connection with the vehicle 100 of FIG. 1 and the motor control system and method 200 of FIG. 2, in accordance with an exemplary embodiment. In a preferred embodiment, the process 300 is conducted separately for each functional block of the second layer 239 of the monitoring path 204 of the control system and method 200 of FIG. 2. Specifically, in a preferred embodiment, the process 300 is conducted separately by the torque determination monitor 236 of FIG. 2, the current reference monitor 238 of FIG. 2, the current regulation monitor 240 of FIG. 2, the pulse width modulation monitor 242 of FIG. 2, the torque calculation monitor 244 of FIG. 2, the input-based calculations monitor 246 of FIG. 2, and any other functional blocks of the second layer 239 of the monitoring path 204 of the control system and method 200 of FIG. 2.

As depicted in FIG. 3, the process begins for each functional block by collecting the required data from the forward control path 202 of FIG. 2 that will be used for the calculations of the respective functional block of the monitoring path 204 of FIG. 2 for which the process is currently being conducted (step 302). This data typically includes the pertinent inputs and outputs of the respective functional block of the forward control path 202 of FIG. 2. In addition, any other data required by the functional block of the monitoring path 204 of FIG. 2 is also utilized by the functional block of the monitoring path 204. Such additional data might include regulator integrator states or filter states, among other possible data from the measured inputs 206 of FIG. 2 and/or from one or more other source. This step is preferably conducted by a processor of the control system and method 200 of FIG. 2, such as a processor of the second layer monitor health determination module 248 thereof.

The respective functional block of the monitoring path 204 then performs the monitor calculations (step 304). The monitor calculations of step 304 preferably include, but are not limited to: performing a redundant calculation, performing an equivalent or simplified calculation, or performing a backward calculation of the respective functional block of the forward control path 202 of FIG. 2 (such as motor torque calculations, reference current calculations, regulated current calculations, pulse width modulation calculations, torque calculations, or current, position, and voltage calculations, among other possible calculations), and/or performing a calculation in a different reference frame and/or for a different time period. This step is preferably conducted by a processor of the control system and method 200 of FIG. 2, such as a processor of the second layer monitor health determination module 248 thereof.

The respective functional block of the monitoring path 204 then compares the outputs and calculation results of the functional block of the monitoring path 204 to the outputs and calculation results from the corresponding functional block of the forward control path 202 of FIG. 2 (step 308). This step is preferably conducted by a processor of the control system and method 200 of FIG. 2, such as a processor of the second layer monitor health determination module 248 thereof.

A determination is then made by the respective functional block of the monitoring path 204 as to whether the results compared in step 306 are identical or within a specified tolerance of one another (step 308). This step is preferably conducted by a processor of the control system and method 200 of FIG. 2, such as a processor of the second layer monitor health determination module 248 thereof.

If the results are identical or within a specified tolerance of one another, the functional block of the monitoring path 204 indicates that the result of the respective functional block of the forward control path 202 of FIG. 2 is considered to be a secured variable or result (step 310). Step 310 is preferably conducted by a processor of the control system and method 200 of FIG. 2, such as a processor of the second layer monitor health determination module 248 thereof.

Conversely, if the difference between the results of the calculations of the respective functional block of the monitoring path 204 calculations and the calculations of the corresponding functional block of the forward control path 202 of FIG. 2 exceed a specified tolerance, the functional block of the monitoring flow path 204 indicates to a higher level controller that the variable or result of the corresponding functional block of the forward control path 202 of FIG. 2 is out of tolerance or not secured, and remedial action, if any, may be taken (step 312). Step 312 is also preferably conducted by a processor of the control system and method 200 of FIG. 2, such as a processor of the second layer monitor health determination module 248 thereof.

In one exemplary embodiment, the proposed functional block of the monitoring path 204 takes no subsequent action to either a passing/failing output and simply continues its monitoring function, and any remedial action is taken by the higher level controller. However, this may vary in other embodiments.

FIG. 4 is a functional block diagram of a distributed monitor system hierarchy 400, and that can be used in connection with the vehicle 100 of FIG. 1, the motor control system and method 200 of FIG. 2, and the process 300 of FIG. 3, in accordance with an exemplary embodiment. As depicted in FIG. 4, the hierarchy 400 includes the second layer monitor health determination module 248 of FIG. 2, the torque determination monitor 236 of FIG. 2, the current reference monitor 238 of FIG. 2 (also referenced in FIG. 4 as a current determination monitor), the current regulation monitor 240 of FIG. 2 (also referenced in FIG. 4 as a current control monitor), the pulse width modulation monitor 242 of FIG. 2, the input-based calculations monitor 246 of FIG. 2, and the torque calculation monitor 244 of FIG. 2. Also as depicted in FIG. 4, the hierarchy 400 preferably also includes any other functional blocks of the second layer 239 of the monitoring path 204 of FIG. 2.

In the depicted embodiment of FIG. 4, each of the monitor functions (or functional blocks of the second layer 239 of the monitoring flow path 204 of FIG. 2) are associated with a particular control module or functional block of the forward control path 202 of FIG. 2, and are independent of one another. In order to determine the security of the overall control system and method 200 of FIG. 2, the validity determination of each of the monitors (or functional blocks of the second layer 239 of the monitoring flow path 204 of FIG. 2) is communicated to the second layer monitor health determination module 248 as illustrated in FIG. 4.

The second layer health determination module 248 (preferably, a processor thereof) processes the inputs from the plurality of monitors (or functional blocks of the second layer 239 of the monitoring flow path 204 of FIG. 2) to determine whether the control system or method 200 of FIG. 2, as a whole, is functioning as intended. In one preferred embodiment, the second layer health determination module 248 indicates a fault condition if one or more of the distributed monitors (or functional blocks of the second layer 239 of the monitoring flow path 204 of FIG. 2) has indicated a non-secure output. For the exemplary application to the hybrid electric vehicle motor torque monitor, the monitoring path 204 monitors all aspects of the system torque production of the control system and method 200. As a result, the system motor forward torque control path 202 of FIG. 2 utilized in the electric motor torque generation is then secured by the monitoring flow path 204 of FIG. 2.

The health determination may also employ time or amplitude considerations to determine overall system health. For the system torque monitor, this would include allowing the system to continue operating if the deviation in torque production is below a pre-determined threshold and/or not of a sufficient time duration which could be considered undesirable to the driver and occupants of the vehicle.

If the second layer health determination module 248 (preferably, a processor thereof) determines that the control system is functioning properly, the control output and monitoring process continue uninterrupted, such as in step 254 of FIG. 2 and step 310 of FIG. 3. Conversely, if the second layer health determination module 248 (preferably, a processor thereof) determines that the control system is not functioning properly, it takes the appropriate remedial action to prevent an undesired fault response (such as in step 256 of FIG. 2 and step 312 of FIG. 3). The remedial actions taken may include one or more of the following: system shutdown, system restart, communicating and indicating the fault detection, fault type and origin, and resulting fault action, among other possible remedial actions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for monitoring an electrical system of a vehicle, the method comprising the steps of:
    performing a plurality of first intermediate calculations pertaining to the electrical system to generate a first plurality of intermediate results using a processor, each of the plurality of first intermediate results pertaining to a respective one of a plurality of parameters pertaining to the electrical system;
    performing an aggregate calculation using the plurality of first intermediate results to generate a calculated value pertaining to the electrical system using the processor;
    performing a plurality of redundant intermediate calculations pertaining to the electrical system to generate a plurality of redundant intermediate results, each of the plurality of redundant intermediate results pertaining to the respective one of the plurality of parameters pertaining to a corresponding one of the plurality of first intermediate results;
    calculating a difference between each redundant intermediate result and the corresponding first intermediate results; and
    taking remedial action using the processor if any of the differences is greater than a predetermined value.

2. The method of step of claim 1, wherein the step of performing the aggregate calculation comprises the step of calculating an electric motor torque for the vehicle using the plurality of intermediate results and the processor.

3. The method of claim 2, wherein the step of performing the plurality of intermediate calculations comprises the step of calculating, using the data and the processor, values for each of the following: a reference current of the electrical system; a regulated current of the electrical system, and a pulse width modulation of the electrical system.

4. A method for monitoring an electrical system of a vehicle, the method comprising the steps of:
    performing a plurality of calculation modules using first data pertaining to the electrical system from first storage areas to generate a plurality of intermediate determinations, each calculation module generating a respective one of a plurality of intermediate determinations using the data and a processor;
    performing an aggregate calculation module using each of the plurality of intermediate determinations to generate an aggregate determination pertaining to the electrical system using the processor; and
    performing a plurality of redundant intermediate calculations using second data from second storage areas separate from the first storage areas to generate a plurality of redundant intermediate determinations, each of the plurality of redundant intermediate calculations generating a corresponding one of the plurality of redundant intermediate determinations that corresponds to a respective one of the plurality of intermediate determinations using the processor.

5. The method of claim 4, further comprising the step of:
    comparing each of the plurality of intermediate determinations with the corresponding one of the plurality of redundant intermediate determinations using the processor.

6. The method of claim 5, further comprising the step of:
    taking remedial action using the processor if any of the plurality of intermediate determinations is not equal to the respective one of the plurality of the plurality of redundant intermediate determinations.

7. The method of claim 5, further comprising the step of:
calculating a difference between each of the plurality of intermediate determinations and the respective one of the plurality of redundant intermediate determinations to generate a plurality of differences using the processor.

8. The method of claim 7, further comprising the step of:
taking remedial action using the processor if any of the differences are greater than a predetermined threshold.

9. The method of step of claim 4, wherein the step of performing the aggregate calculation comprises the step of calculating an electric motor torque for the vehicle using the plurality of intermediate determinations and the processor.

10. The method of claim 9, wherein the step of performing the plurality of intermediate calculations comprises the steps:
calculating a reference current of the electrical system using the data and the processor;
calculating a regulated current of the electrical system using the data and the processor; and
calculating a pulse width modulation of the electrical system using the data and the processor.

11. A system for monitoring an electrical system of a vehicle, the system comprising:
a plurality of sensors configured to obtain data pertaining to the electrical system; and
a processor coupled to the plurality of sensors and configured to:
perform a plurality of calculation modules using first data pertaining to the electrical system from first storage areas to generate a plurality of intermediate determinations, each calculation module generating a respective one of a plurality of intermediate determinations using the data;
perform an aggregate calculation module using each of the plurality of intermediate determinations to generate an aggregate determination pertaining to the electrical system; and
perform a plurality of redundant intermediate calculations using second data from second storage areas separate from the first storage areas to generate a plurality of redundant intermediate determinations, each of the plurality of redundant intermediate calculations generating a corresponding one of the plurality of redundant intermediate determinations that corresponds to a respective one of the plurality of intermediate determinations.

12. The system of claim 11, wherein the processor is further configured to compare each of the plurality of intermediate determinations with the corresponding one of the plurality of redundant intermediate determinations.

13. The system of claim 12, wherein the processor is further configured to take remedial action if any of the plurality of intermediate determinations is not equal to the respective one of the plurality of the plurality of redundant intermediate determinations.

14. The system of claim 12, wherein the processor is further configured to:
calculate a difference between each of the plurality of intermediate determinations and the respective one of the plurality of redundant intermediate determinations to generate a plurality of differences; and
take remedial action if any of the differences are greater than a predetermined threshold.

15. The system of claim 11, wherein the processor is further configured to:
calculate a reference current of the electrical system using the data and the processor;
calculate a regulated current of the electrical system using the data and the processor;
calculate a pulse width modulation of the electrical system using the data and the processor;
calculate the electric motor torque using the reference current, the regulated current, and the pulse width modulation;
calculate a redundant value of the reference current;
calculate a redundant value of the regulated current; and
calculate a redundant value of the pulse width modulation.

16. The system of claim 11, wherein the processor is further configured to:
compare the reference current with the redundant value of the reference current;
compare the regulated current with the redundant value of the regulated current; and
compare the pulse width modulation with the redundant value of the pulse width modulation.

17. The method of claim 1, wherein:
the plurality of first intermediate calculations are performed using data from a first memory; and
the plurality of intermediate calculations are performed using data from a second memory that is separate from the first memory.

* * * * *